US012201052B2

United States Patent
Enomoto et al.

(10) Patent No.: US 12,201,052 B2
(45) Date of Patent: Jan. 21, 2025

(54) WORK MACHINE WITH A ROTARY MEMBER AND TORQUE CONTROL THEREFOR

(71) Applicant: HONDA MOTOR CO., LTD., Tokyo (JP)

(72) Inventors: Takayuki Enomoto, Wako (JP); Takeshi Yamaji, Wako (JP); Yuta Mizuno, Wako (JP); Hiroya Takahashi, Wako (JP); Fumio Minami, Wako (JP); Norikazu Shimizu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 320 days.

(21) Appl. No.: 17/864,918

(22) Filed: Jul. 14, 2022

(65) Prior Publication Data
US 2022/0369544 A1 Nov. 24, 2022

Related U.S. Application Data

(63) Continuation of application No. PCT/JP2020/002161, filed on Jan. 22, 2020.

(51) Int. Cl.
*A01D 34/00* (2006.01)
*A01D 34/71* (2006.01)
*A01D 34/76* (2006.01)
*A01D 101/00* (2006.01)

(52) U.S. Cl.
CPC .......... *A01D 34/006* (2013.01); *A01D 34/71* (2013.01); *A01D 34/76* (2013.01); *A01D 2101/00* (2013.01)

(58) Field of Classification Search
CPC ...... A01D 34/006; A01D 34/71; A01D 34/76; A01D 34/78
See application file for complete search history.

(56) References Cited

U.S. PATENT DOCUMENTS

| | | | |
|---|---|---|---|
| 6,591,593 B1 * | 7/2003 | Brandon ................ | A01D 69/02 56/10.8 |
| 7,777,444 B2 | 8/2010 | Kawakami | |
| 9,125,341 B2 * | 9/2015 | Ebihara ................ | A01D 34/667 |
| 9,198,347 B2 | 12/2015 | Nagahama | |
| 9,894,832 B2 | 2/2018 | Scrivner et al. | |

(Continued)

FOREIGN PATENT DOCUMENTS

| | | |
|---|---|---|
| CN | 101077050 A | 11/2007 |
| CN | 105409439 A | 3/2016 |

(Continued)

OTHER PUBLICATIONS

Extended European Search Report for European Patent Application No. 20915967.2 mailed Dec. 16, 2022.

(Continued)

*Primary Examiner* — Alicia Torres
(74) *Attorney, Agent, or Firm* — Thomas | Horstemeyer, LLP

(57) ABSTRACT

A work machine comprises, a drive source, a working unit that includes a rotary member rotated by the drive source and performs a predetermined work by rotation of the rotary member, and a control unit that controls the drive source so that output of the rotary member partially takes different values in one rotation of the rotary member.

20 Claims, 7 Drawing Sheets

(56) References Cited

U.S. PATENT DOCUMENTS

| | | |
|---|---|---|
| 10,869,424 B2 | 12/2020 | Xu et al. |
| 11,465,263 B2 | 10/2022 | Woetzl et al. |
| 2007/0272510 A1 | 11/2007 | Kawakami |
| 2012/0228041 A1 | 9/2012 | Borinato |
| 2014/0208599 A1 | 7/2014 | Nagahama |
| 2016/0073580 A1 | 3/2016 | Scrivner et al. |
| 2019/0021223 A1 | 1/2019 | Xu et al. |
| 2019/0118353 A1 | 4/2019 | Woetzl et al. |
| 2021/0169000 A1 | 6/2021 | Yamagishi et al. |
| 2024/0081174 A1* | 3/2024 | Bagwan ............... A01D 34/78 |
| 2024/0276913 A1* | 8/2024 | Matsuda ............. A01D 34/826 |

FOREIGN PATENT DOCUMENTS

| | | |
|---|---|---|
| CN | 107371562 A | 11/2017 |
| DE | 202015006182 U1 | 11/2015 |
| JP | 2012-161283 A | 8/2012 |
| JP | 2014-233254 A | 12/2014 |
| WO | 2014/002845 A1 | 1/2014 |
| WO | 2017/174415 A1 | 10/2017 |
| WO | 2019/097683 A1 | 5/2019 |
| WO | 2021/149198 A1 | 7/2021 |

OTHER PUBLICATIONS

International Search Report and Written Opinion for PCT/JP2020/002161 mailed Mar. 24, 2020.
Chinese Office Action for Chinese Patent Application No. 202080093634.X mailed Apr. 8, 2024 (partially translated).

* cited by examiner

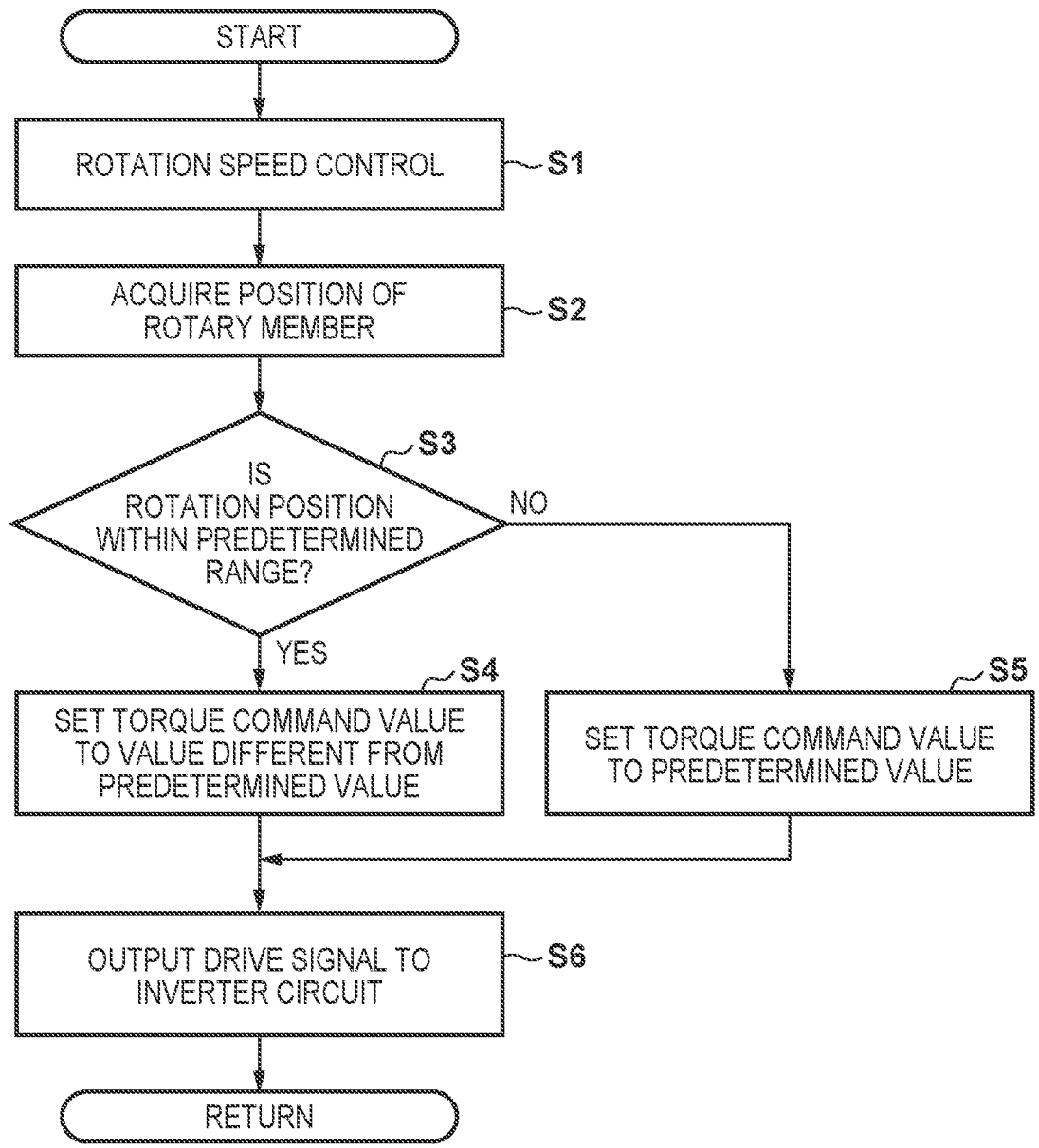

WORK MACHINE WITH A ROTARY MEMBER AND TORQUE CONTROL THEREFOR

CROSS-REFERENCE TO RELATED APPLICATION(S)

This application is a continuation of International Patent Application No. PCT/JP2020/002161 filed on Jan. 22, 2020, the entire disclosure of which is incorporated herein by reference.

BACKGROUND OF THE INVENTION

Field of the Invention

The present invention relates to a work machine and a non-transitory computer-readable storage medium.

Description of the Related Art

A work machine such as a lawn mower or a snow blower performs predetermined work using a rotational driving force of a drive source such as a motor. International Publication No. 2019/097683 discloses a work machine that controls a target rotation speed of a work motor according to a work load.

SUMMARY OF THE INVENTION

According to an aspect of the present invention, there is provided a work machine comprising: a drive source; a working unit that includes a rotary member rotated by the drive source and performs a predetermined work by rotation of the rotary member; and a control unit that controls the drive source so that output of the rotary member partially takes different values in one rotation of the rotary member.

According to another aspect of the present invention, there is provided a non-transitory computer-readable storage medium storing a program for causing a computer of a work machine including a drive source and a working unit that includes a rotary member rotated by the drive source and performs a predetermined work by rotation of the rotary member, to function as: a control unit that controls the drive source so that output of the rotary member partially takes different values in one rotation of the rotary member.

Further features of the present invention will become apparent from the following description of exemplary embodiments (with reference to the attached drawings).

BRIEF DESCRIPTION OF THE DRAWINGS

FIG. 6 is a flowchart illustrating a processing example of the control unit.

DESCRIPTION OF THE EMBODIMENTS

Figure 1:
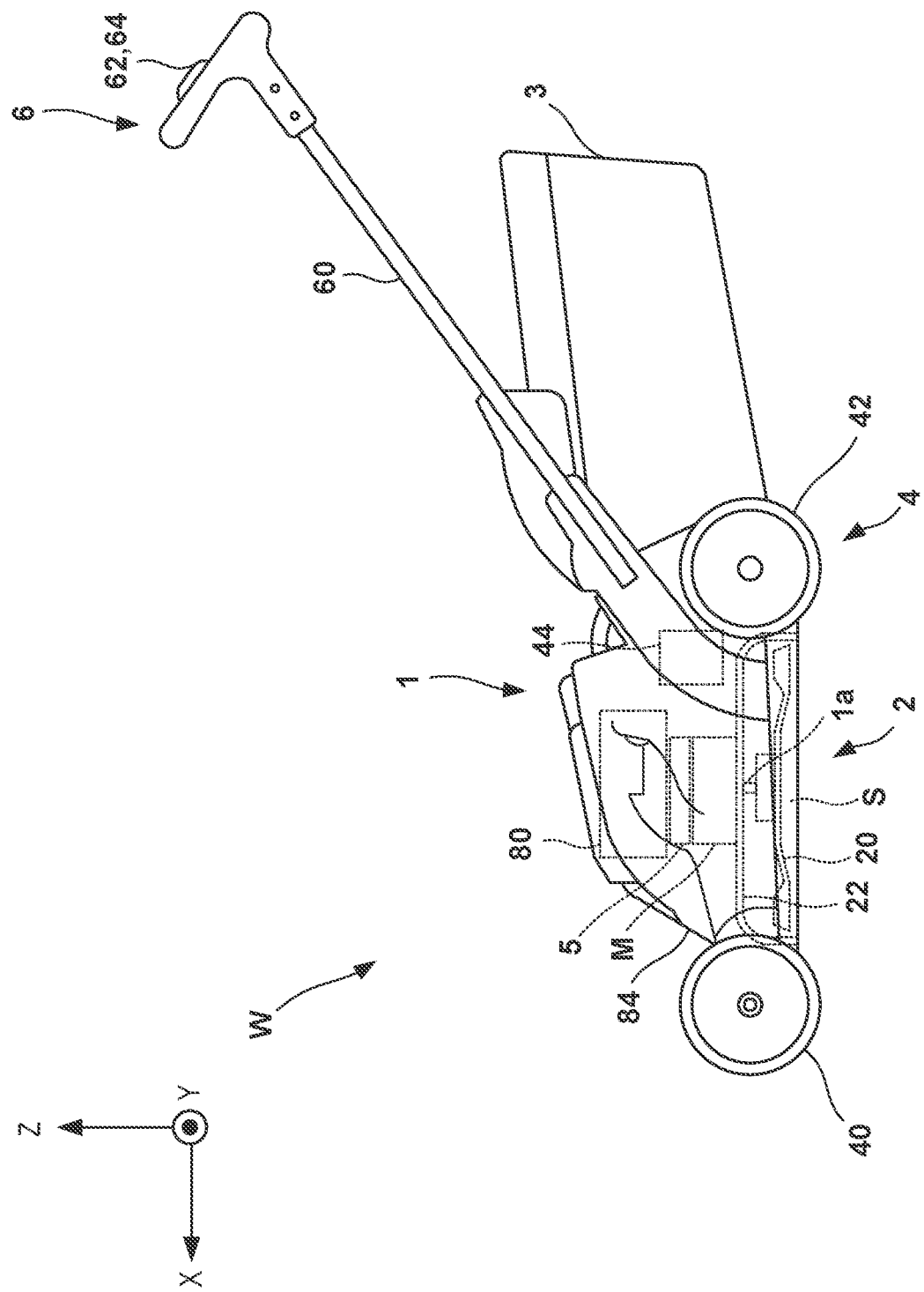
FIG. 1 is a side view illustrating an outline of a work machine according to an embodiment of the present invention.

In the work machine of the related art described above, there has been a case where improvement in a driving mode of a working mechanism is required for the purpose of further improving the efficiency and performance of work. An illustrative object of an embodiment of the present invention is to provide a technique advantageous for further improvement in efficiency, performance, and the like of a work machine.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In addition, in each drawing, arrows X, Y, and Z indicate directions orthogonal to one another, the X direction indicates a front-and-rear direction of a work machine W, the Y direction indicates a vehicle width direction (a left-and-right direction) of the work machine W, and the Z direction indicates an up-and-down direction. To be noted, in the following description, the left-and-right direction refers to the left and right in a state of facing the forward side of the work machine W.

<Outline of Work Machine>

Figure 2:
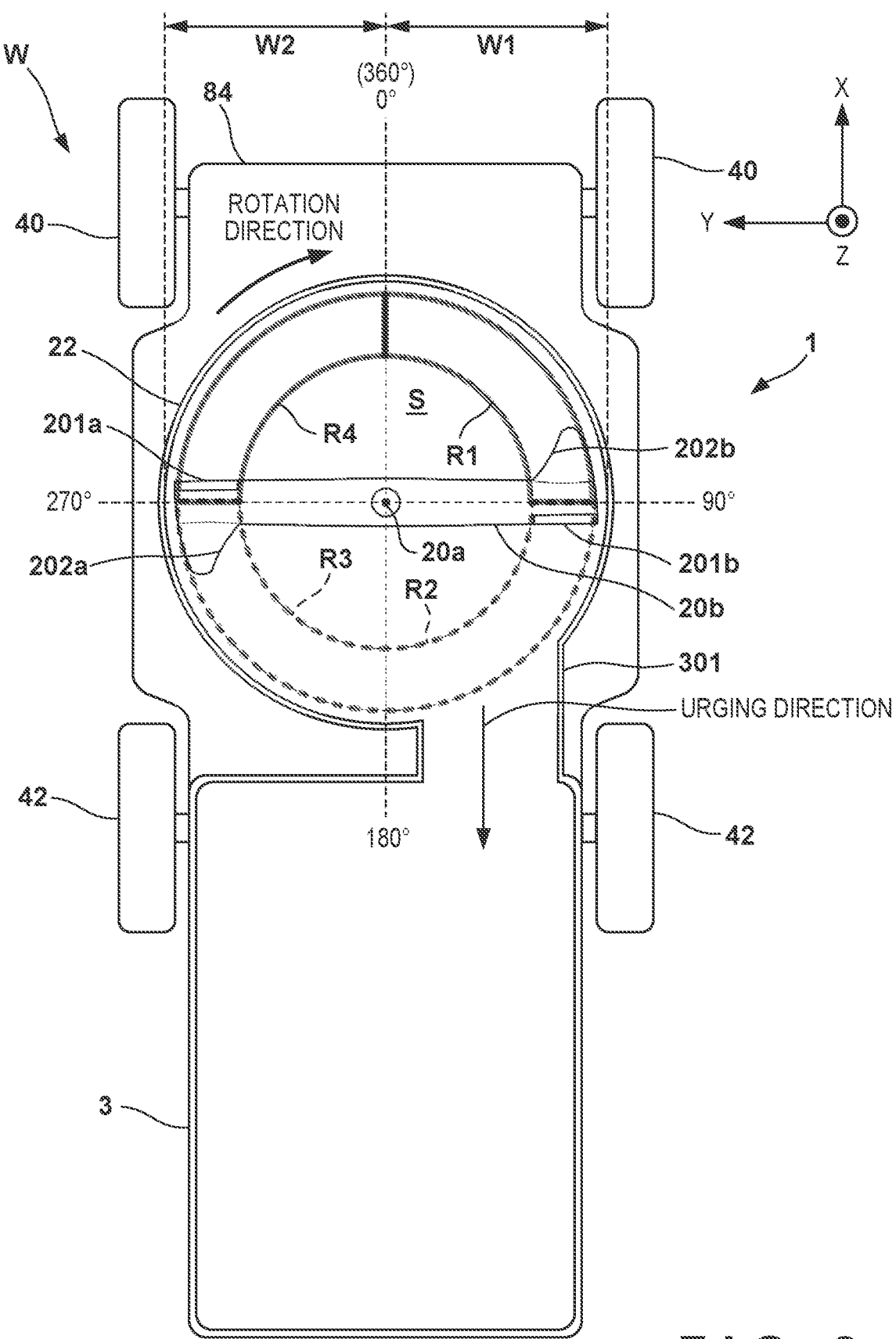
FIG. 2 is a plan view schematically illustrating an internal configuration of the work machine of FIG. 1.

FIG. 1 is a side view illustrating the outline of the work machine W according to an embodiment, and FIG. 2 is a plan view schematically illustrating an internal configuration of the work machine W of FIG. 1. The work machine W is a so-called walk-type lawn mower in which a worker operates an operation unit 6, which will be described later, while walking behind the work machine W to cut the lawn grass. The work machine W includes a main body portion 1 and an operation unit 6 that operates the main body portion 1. The main body portion 1 includes a working motor M (hereinafter referred to as a motor M), a working unit 2, a collection unit 3, a traveling unit 4, and a control unit 5 (see FIG. 3).

The motor M is a drive source of the rotary member 20 of the working unit 2, and is an electric motor that rotationally drives the rotary member 20. In the present embodiment, the motor M is a three-phase brushless motor. However, other types of motors can be employed as the motor M. The work machine W may include an engine instead of the motor M as a drive source of the rotary member 20, or may include an engine and an electric motor as drive sources. In addition, a speed reducer that reduces the rotation speed of the motor M may be provided between the motor M and the rotary member 20.

The working unit 2 performs predetermined work by the rotary member 20 rotated by the motor M. In the present embodiment, the working unit 2 includes the rotary member 20 and a cutter housing 22 (cover portion) provided to cover the rotary member 20 and defining a work space S for the working unit 2.

The rotary member 20 rotates with an output shaft 1a of the motor M extending in the up-and-down direction as a rotation shaft 20a. In the present embodiment, the rotary member 20 is formed of, for example, a metal material such as iron or aluminum. The rotary member 20 includes cutting portions 201a and 201b capable of cutting lawn grass. In the present embodiment, the rotary member 20 is a two-blade cutter blade, and has an elongated plate-like extending portion 20b extending from the rotation shaft 20a on both sides in the radial direction, and cutting portions 201a and 201b are provided at both ends thereof. That is, the rotary member 20 includes the plurality of cutting portions 201a and 201b different in the circumferential direction with respect to the rotation shaft 20a. Then, as illustrated in FIG. 2, the rotary member 20 rotates clockwise in plan view, and thus the lawn grass is cut by the cutting portions 201a and 201b. In the following description, the cutting portions 201a and 201b may be collectively referred to as a cutting portion 201. To be noted, although a two-blade cutter blade is adopted as the rotary member 20 in the present embodiment, a single-blade cutter blade or a cutter blade of three or more blades can also be adopted.

In addition, the rotary member 20 includes fans 202a and 202b that urge a target object in a predetermined direction. In the present embodiment, the fans 202a and 202b urge lawn grass which is a target object in a direction in which the lawn grass is introduced into the collection unit 3. In the present embodiment, the fans 202a and 202b are provided behind the cutting portions 201a and 201b in the rotation direction of the rotary member 20, respectively, and are formed so as to be bent upward with respect to the plane in which the rotary member 20 rotates. As a result, an airflow is generated in the rotation direction by the rotation of the rotary member 20, and an airflow is also generated in a direction from the work space S to a discharge port 301, so that the cut lawn grass cut is urged by the airflow and introduced into the collection unit. In the following description, the fans 202a and 202b may be collectively referred to as a fan 202.

The cutter housing 22 covers the rotary member 20 and defines the work space S for the rotary member 20. The cutter housing 22 is provided so as to cover the rotary member 20, for example, in order to protect the rotary member 20, prevent scattering of cut lawn grass, and the like. In the present embodiment, the cutter housing 22 is provided so as to cover the rotary member 20 on the front side in the traveling direction of the work machine W and on the side of the work machine W.

The collection unit 3 is a grass bag that collects the lawn grass cut by the cutting portion 201. In the present embodiment, the collection unit 3 is provided at a rear portion of the work machine W, and is connected to the space covered by the cutter housing 22 via a discharge port 301. With this configuration, the lawn grass cut by the cutting portion 201 is introduced into the collection unit 3 together with the airflow generated by the fan 202. The structure for discharging air introduced into the collection unit 3 can be designed as appropriate. For example, the collection unit 3 may return the introduced air to the space side covered with the cutter housing 22 again, or may exhaust the air to the rear side of the collection unit 3.

To be noted, in the present embodiment, the discharge port 301 is formed within a range W1 in the width direction in which the fan 202 advances toward the collection unit 3. The fan 202 advances toward the collection unit 3 (more specifically, the discharge port 301) when passing the area between 0° and 180°, which is on the right half side in the cutter housing 22 in the direction of FIG. 2, and advances away from the collection unit 3 (more specifically, the discharge port 301) when passing the area between 180° and 360°, which is on the left half side. In the present embodiment, the range of the discharge port 301 in the width direction is formed within the range on the right half side where the fan advances toward the discharge port 301. Therefore, the influence of the airflow generated by the fan 202 moving in the direction away from the discharge port 301 is suppressed. That is, urging of the lawn grass from the discharge port 301 side toward the cutter housing 22 side can be suppressed.

The traveling unit 4 drives the work machine W to travel. The traveling unit 4 includes a pair of front wheels 40 and a pair of rear wheels 42 each provided separately in the width direction of the work machine W, and a traveling motor 44. In the present embodiment, the rotational driving force of the traveling motor 44 is transmitted to the rear wheels 42 via an unillustrated transmission mechanism. To be noted, the rotational driving force of the traveling motor 44 may be transmitted at a rotation speed appropriately converted by the transmission mechanism. In addition, the work machine W may be a front wheel drive in which the rotational driving force of the traveling motor 44 is transmitted to the front wheels 40. To be noted, in one embodiment, the traveling motor 44 can be omitted. That is, the traveling unit 4 may include the front wheels 40 and the rear wheels 42, and the work machine W may travel by a force with which the worker pushes the work machine W.

The operation unit 6 is provided for an operator to operate the work machine W, and includes a bar 60, a work operation unit 62, and a travel operation unit 64. The bar 60 extends rearward and upward as a pair on the left and right side from one ends fixed to the main body portion 1, and is connected at upper ends thereof. The travel operation unit 64 is provided on the bar 60, and receives various inputs for the operation of the traveling unit 4 by the worker. In addition, the work operation unit 62 is provided on the bar 60, and receives various inputs for the operation of the working unit 2 by the worker. As an example, the work operation unit 62 may receive an input regarding switching of start/stop of driving of the working unit 2. In addition, when a plurality of modes are provided as the drive mode of the working unit 2, the work operation unit 62 may receive an input for mode switching.

In addition, the main body portion 1 includes the control unit 5 that controls the working unit 2, and a battery 80 capable of supplying power to each electrical element of the work machine W. Furthermore, the main body portion 1 includes a cover member 84 that covers the working unit 2, the battery 80, and the like.

<Control Configuration>

Figure 3:
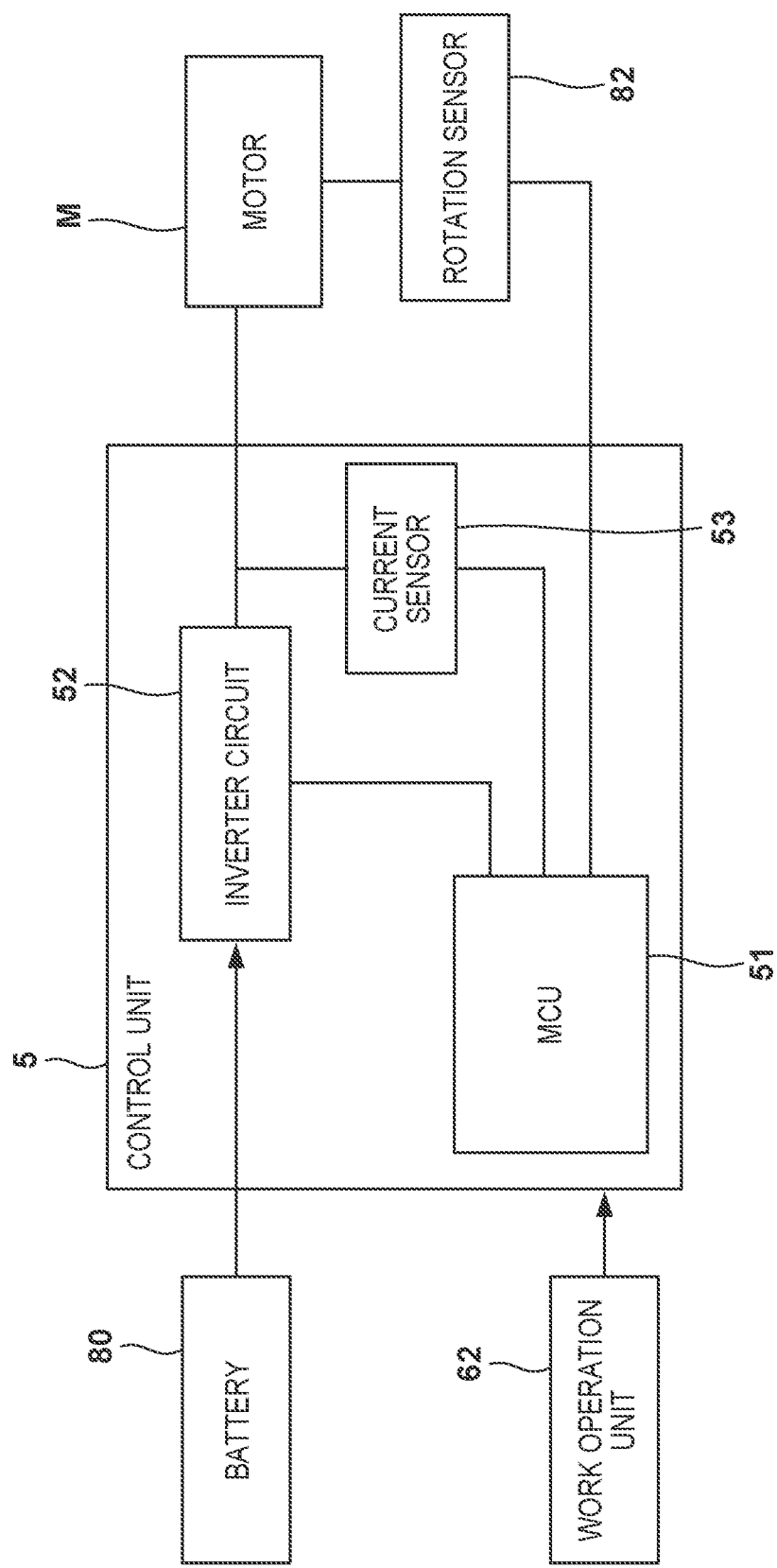
FIG. 3 is a diagram illustrating an example of a hardware configuration of the work machine of FIG. 1.

Next, a control configuration of the control unit 5 for the working unit 2 will be described. FIG. 3 is a diagram illustrating an example of a hardware configuration of the work machine W, and is a diagram mainly illustrating a configuration related to driving of the working unit 2. In one embodiment, the control unit 5 is a power drive unit (PDU) that controls the driving of the motor M, and includes a micro control unit (MCU) 51, an inverter circuit 52, and a current sensor 53.

The MCU 51 includes a processor represented by a CPU, a memory such as a RAM and a ROM, and an input/output interface (all not illustrated) that relays transmission and reception of signals between the processor and an external device. The MCU 51 executes various control by the processor processing a program stored in the memory. Specifically, the MCU 51 executes rotation speed control and torque control of the motor M, and generates a drive signal to be output to the inverter circuit 52. That is, the MCU 51 constitutes a drive circuit of the motor M. The MCU 51 can be a computer that implements the present invention related to a program.

The inverter circuit 52 converts a direct current of the battery 80 into a motor drive alternating current on the basis of the drive signal output from the MCU 51, and outputs the motor drive alternating current to the motor M. To be noted, since the configuration of the inverter circuit 52 is well known, a detailed description thereof will be omitted. In addition, the current sensor 53 detects a current value output from the inverter circuit 52 to the motor M.

In addition, in the present embodiment, the work machine W includes the rotation sensor 82 that detects the rotation speed and the rotational position, in other words, the rotation angle, of the motor M. For example, the rotation sensor 82 may be a rotary encoder capable of converting a mechanical displacement amount of rotation into an electric signal and processing the signal to detect a position, a rotation speed, and the like. Note that a sensor that detects a rotation speed such as a tachometer and a sensor that detects a rotational position such as a potentiometer may be provided separately. Note that the rotation sensor 82 may be omitted in one embodiment. In this case, the mechanical position of the rotating motor M may be estimated by the induced voltage of the motor M or the like. Furthermore, the rotation speed of the motor M may be estimated on the basis of the estimation result.

Note that the configuration illustrated in FIG. 3 is an example, and other configurations can be adopted. For example, it is also possible to adopt a configuration provided separately from the MCU 51 that outputs a drive signal and the inverter circuit 52 that outputs a motor drive current on the basis of the drive signal. In addition, although not illustrated in FIG. 3, the drive control of the traveling motor 44 and the drive control of the motor M for work may be performed by one electronic control unit (ECU). Furthermore, at least a part of the functions implemented by the MCU 51 may be configured by hardware. In addition, various control may be executed using a micro processing unit (MPU) instead of the MCU 51.

Figure 4:
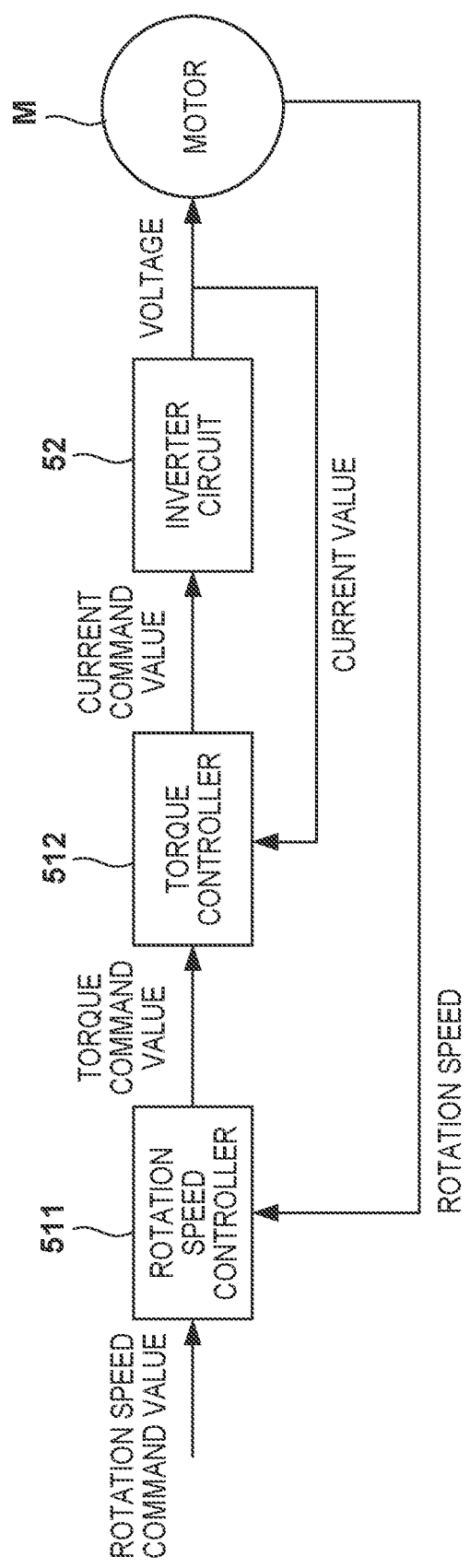
FIG. 4 is a block diagram illustrating an outline of motor drive control by a control unit.

FIG. 4 is a block diagram illustrating an outline of drive control of the motor M by the control unit 5. In the present embodiment, a current command value as a drive signal is determined by a rotation speed controller 511 and a torque controller 512 realized by the MCU 51, and the inverter circuit 52 controls the output of the motor M on the basis of the current command value.

On the basis of the difference between a predetermined rotation speed command value and the actual rotation speed of the motor M acquired by the rotation sensor 82, the rotation speed controller 511 outputs a torque command value so that the actual rotation speed of the motor M becomes closer to the rotation speed command value. On the basis of the torque command value output from the rotation speed controller 511 and the drive current value of the motor M acquired by the current sensor 53, the torque controller 512 calculates a torque command value that causes the motor M to behave as intended, and outputs a current command value corresponding thereto to the inverter circuit 52. The inverter circuit 52 converts a direct current of the battery 80 into a motor drive alternating current on the basis of the current command value output from the torque controller 512, and outputs the motor drive alternating current to the motor M.

Here, the control unit 5 executes the drive control of the motor M described above using vector control. Although the vector control is a well-known technique and thus detailed description thereof will be omitted, the vector control is control in which arithmetic processing is performed while treating a three-phase alternating current value as a two-phase direct current value by coordinate conversion or the like. By using the vector control, not the three-phase alternating current value that constantly changes but the direct current value serves as the control target, so that the drive current value of the motor M can be directly controlled, and more effective torque control can be performed. For example, in a case where only the rotation speed control based on the detection result of the rotation sensor 82 such as 120° energization control or sine wave control, is performed, it is difficult to control the torque. However, by directly controlling the drive current value using the vector control, it is possible to increase or decrease the rotation speed and the torque even during one rotation of the motor M.

In the present embodiment, the control unit 5 executes both the rotation speed control and the torque control of the motor M. Therefore, the control unit 5 can increase or decrease the rotation speed or the torque during one rotation of the motor M by the torque control while rotating the motor M at a predetermined rotation speed by the rotation speed control. That is, the control unit 5 can microscopically control the torque of the motor M by the torque control while macroscopically controlling the rotation speed of the motor M by the rotation speed control.

Operation Example of Work Machine W

Figure 5A:
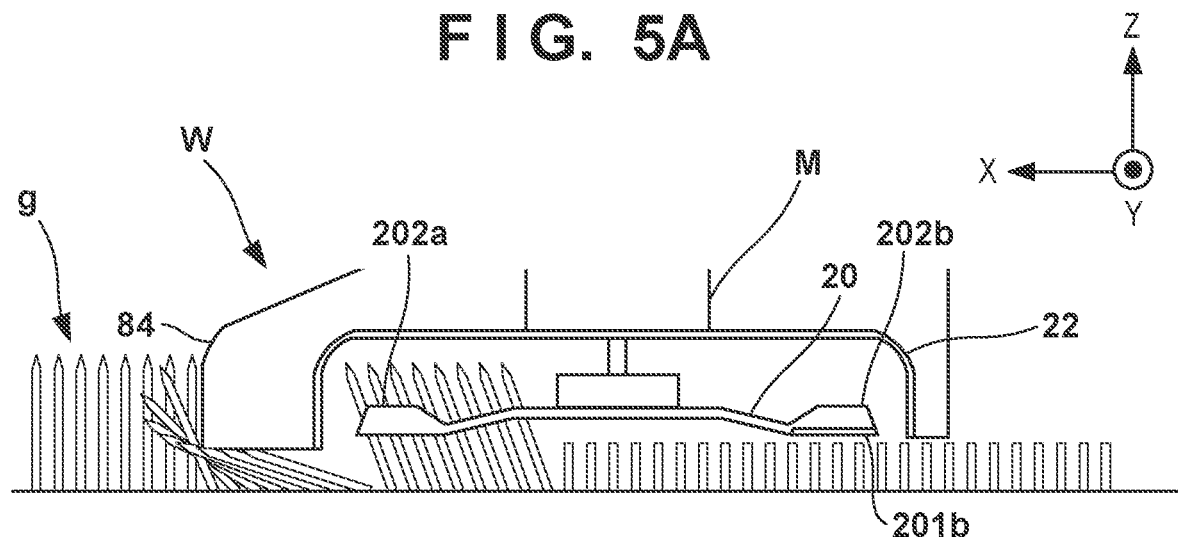
FIG. 5A is a diagram schematically illustrating a state of lawn grass when the work machine is used to cut grass.
Figure 5B:
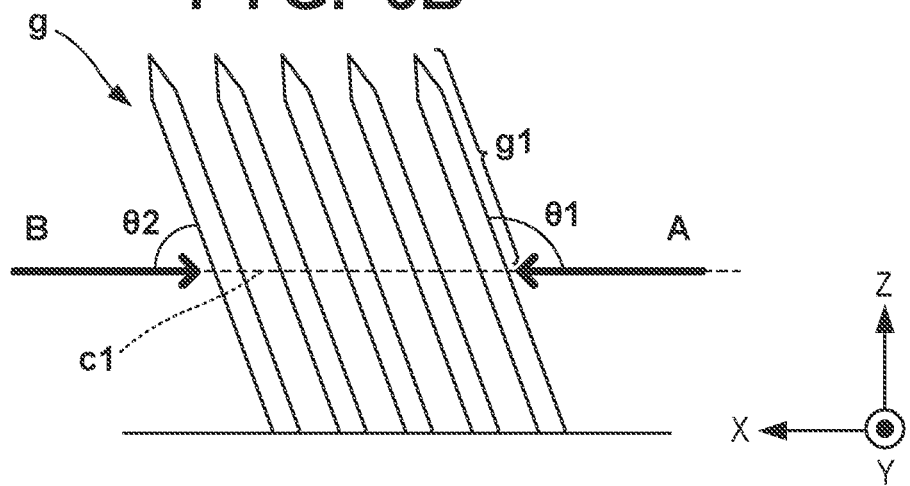
FIG. 5B is a diagram for describing a relationship between lawn grass to be cut and a cutting direction of a cutting portion.
Figure 5C:
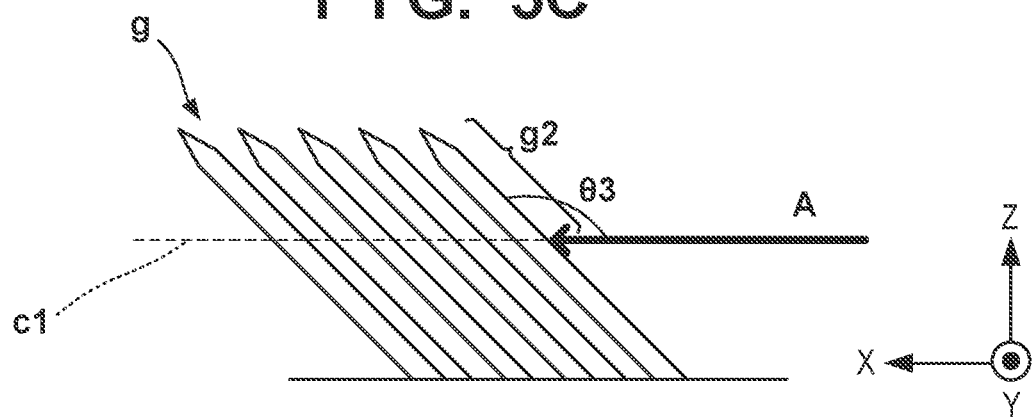
FIG. 5C is a diagram for describing a relationship between the lawn grass to be cut and the cutting direction of the cutting portion.

FIG. 5A is a diagram schematically illustrating a state of lawn grass g when the work machine W cuts the lawn grass, and FIGS. 5B and 5C are diagrams for describing a relationship between the lawn grass g to be cut and a cutting direction of the cutting portion 201.

As described above, the cutter housing 22 is provided on the forward side of the rotary member 20. Therefore, when the work machine W performs lawn mowing while moving forward by the traveling unit 4, the lawn grass g in front of the rotary member 20 is pushed down to the forward side by the cutter housing 22 or the cover member 84. Therefore, in a case where the inclination of the lawn grass has not returned to the original state at the time of being cut by the cutting portion 201, the lawn grass g is cut by the cutting portion 201 in a state of being inclined toward the forward side.

Here, when cutting the lawn grass while the cutting portion 201 is rotating in a range R4 from 270° to 360° at the rotation angle illustrated in FIG. 2, that is, when cutting the lawn grass on the left half side of the work machine W, the cutting portion 201 comes into contact with lawn grass g while moving in the forward direction. That is, the cutting portion 201 comes into contact with the lawn grass in an arrow A direction of FIG. 5B. In this case, since the cutting portion 201 and lawn grass g come into contact with each other at an obtuse angle $\Theta 1$, resistance between the cutting portion 201 and the lawn grass is relatively low, and the cutting portion 201 may slip on the lawn grass g. Therefore, as illustrated in FIG. 5C, there is a case where the lawn grass g is cut by the cutting portion 201 in a state of being further pushed down than the state illustrated in FIG. 5B. That is, the angle Θ3 (FIG. 5C) at the time when the lawn grass g is actually cut may be larger than the angle Θ1 (FIG. 5B) of these at the time when the cutting portion 201 and the lawn grass g contact each other. As a result, the length of a cut portion g2 in a case where the lawn grass is cut during rotation in the range R4 may be smaller than the length of the cut portion g1 in a case where the cutting is performed without the cutting portion 201 slipping on the lawn grass g. Therefore, the height of the lawn grass g after cutting tends to shift upward.

In contrast, when cutting the lawn grass while the cutting portion 201 is rotating in a range R1 from 0° to 90° at the rotation angle illustrated in FIG. 2, that is, when cutting the lawn grass on the right half side of the work machine W, the cutting portion 201 comes into contact with the lawn grass while moving in the rearward direction. That is, the cutting portion 201 comes into contact with the lawn grass in an arrow B direction of FIG. 5B. In this case, since the cutting portion 201 and the cut portion g1 of the lawn grass contact each other at an acute angle Θ2, resistance between the cutting portion 201 and the lawn grass is relatively large, and thus the cutting portion 201 is less likely to slip on the lawn grass. Therefore, the lawn grass after the cutting tends to be less likely to shift upward as compared with the case of cutting in the arrow A direction.

As a result, there is a case where there is a difference in height after the lawn mowing between a portion cut on the left half side and a portion cut on the right half side of the work machine W in the cut portion of the lawn grass. Therefore, the lawn grass may be cut to a height not intended by the user, which may affect the work efficiency of the work machine W. Therefore, for the purpose of further improving the efficiency and performance of the lawn mowing work by the work machine W, improvement of the driving mode of the working mechanism has been required in some cases.

Therefore, in the present embodiment, the control unit 5 performs the following processing to reduce the difference in height after the lawn mowing. FIG. 6 is a flowchart illustrating a processing example of the control unit 5. For example, this flowchart is started when the control unit 5 receives a signal for starting the working unit 2 received by the work operation unit 62. To be noted, S1 corresponds to the processing of the rotation speed controller 511, and S2 and subsequent steps correspond to the processing of the torque controller 512.

In S1, the rotation speed controller 511 performs rotation speed control. Specifically, on the basis of the difference between a predetermined rotation speed command value and the actual rotation speed of the motor M acquired on the basis of a detection result of the rotation sensor 82, the torque command value is determined so that the actual rotation speed of the motor M becomes closer to the rotation speed command value. To be noted, the predetermined rotation speed command value may be, for example, a fixed value determined according to the type of the work machine W. When a work mode or the like can be selected by the operation unit 6, a value determined according to the mode may be used.

In S2, the torque controller 512 acquires the rotational position of the rotary member 20. Specifically, the torque controller 512 acquires the rotational position on the basis of the detection result of the rotation sensor 82.

In S3, the torque controller 512 checks whether or not the position of the rotary member 20 is within a predetermined range, proceeds to S4 in the case where the position is within the predetermined range, and proceeds to S5 in the case where the position is outside the predetermined range. In the present embodiment, the predetermined range is a range in which one of the cutting portions 201a and 201b is located between 270° and 360°.

In S4, the torque controller 512 sets the torque command value to a value different from a value based on the rotation speed control. In the present embodiment, the torque controller 512 sets the torque command value to be higher than a predetermined value. In contrast, in S5, the torque controller 512 sets the torque command value to a value based on the rotation speed control.

In S6, the torque controller 512 converts the torque command value set in S4 or S5 into a direct current command value, and outputs the direct current command value to the inverter circuit 52 as a drive signal. For example, the torque controller 512 performs the change with reference to a torque command value-current command value conversion table stored in the memory of the MCU 51.

Figure 7:
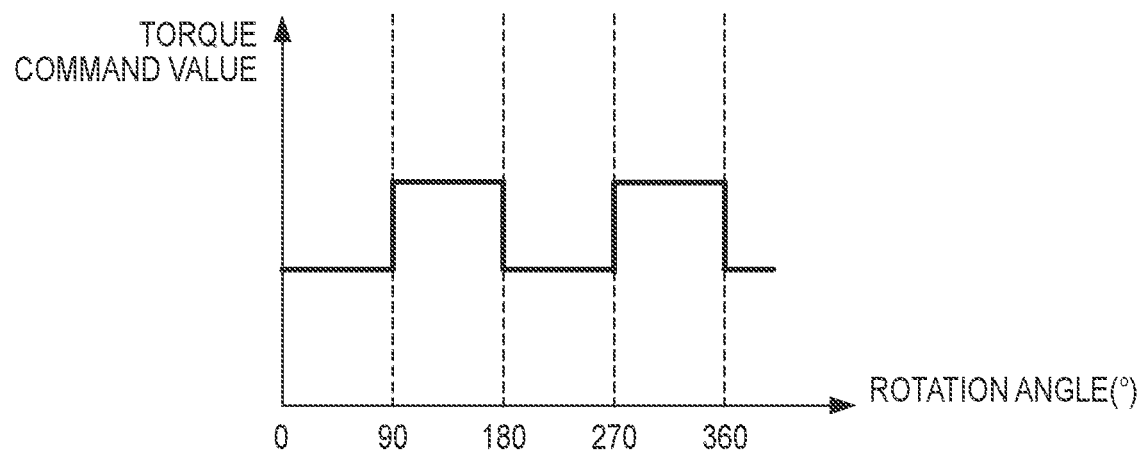
FIG. 7 is a graph illustrating a relationship between a torque command value set by a torque controller and a rotational position of a rotary member of a case where the flowchart of FIG. 6 is executed.

FIG. 7 is a graph illustrating a relationship between the torque command value set by the torque controller and the rotational position of the rotary member 20 of a case where the flowchart of FIG. 6 is executed. The horizontal axis represents the rotation angle of the cutting portion 201a. The torque controller 512 is controlled such that the torque command value is higher than the predetermined value when the cutting portion 201 is located in the range R2, which is from 90° to 180°, and the range R4. Here, when the cutting portion 201a is located in the range R2, the cutting portion 201b is located in the range R4. Therefore, the torque controller 512 executes control so that the torque command value increases when either the cutting portion 201a or the cutting portion 201b is located in the range R4.

As a result, the torque command value while either the cutting portion 201a or the cutting portion 201b is moving in the forward direction and cutting lawn grass becomes higher than the predetermined value. Therefore, since the rotation speed of the rotary member 20 at the rotational position where the height of the lawn grass after cutting is likely to shift upward increases, the height of the lawn grass to be cut becomes less likely to shift upward, and the difference in the height of the lawn grass after the lawn mowing becomes less likely to occur. That is, the work machine W can cut lawn grass at a more similar height. Therefore, by the above control, it is possible to improve the doneness of lawn mowing by the work machine W, in other words, the work performance of the work machine W.

To be noted, although the control unit 5 controls the motor M so that the value of the torque of the motor M partially varies during one rotation of the rotary member 20 in the present embodiment, the motor M may be controlled so that the rotation speed of the motor M partially varies during one rotation. Specifically, the control unit 5 may control the motor M so that the rotation speed of the motor M increases in the state where the cutting height of the lawn grass is likely to shift upward. That is, the control unit 5 may control the motor M so that the output of the motor M increases during one rotation of the rotary member 20. By adopting such control, the relative rotation speed of the rotary member 20 in a state where the cutting height of the lawn grass is likely to shifted upward is increased as compared with a case where such control is not adopted, and thus a difference in the height of the lawn grass after lawn mowing is less likely to occur. It is therefore possible to improve the work performance of the work machine W.

To be noted, although the predetermined range in which the torque command value is increased is a range in which one of the cutting portions 201a and 201b is located in the range R4 in the processing example described above, the predetermined range of the angle for changing the output can be changed. In one embodiment, the predetermined range may be at least a part of a range in which either one of the cutting portions 201a and 201b moves in the forward direction. Specifically, the predetermined range may be a range in which either one of the cutting portions 201a and 201b is located in a range from 270° to 300°. By increasing the output of the motor M in only a range where the vector component of the movement speed of the cutting portion 201 in the forward direction is larger, it is possible to suppress the power consumption from the driving of the motor M while improving the work performance.

To be noted, although the predetermined range is set in consideration of improvement of the work performance of the work machine W in the processing example described above, the predetermined range may be set in consideration of power saving of the work machine W. In the case where the working unit 2 cuts lawn grass while the work machine W moves forward, the cutting portion 201 cuts most of the lawn grass when moving in the range R1 and the range R4 which are ranges on the front side of the rotation shaft 20a. Therefore, when the cutting portion 201 moves in the range R2 and the range R3, the cutting portion 201 passes a part where most of the lawn grass has been already cut, and therefore it is less necessary to increase the torque as the case where the cutting portion moves in the ranges R1 and R4. Therefore, the predetermined range may be set such that either one of the cutting portions 201a and 201b is on the forward side of the rotation shaft 20a of the rotary member 20, that is, at least a part of the range R4 and the range R1. For example, in the case of a single blade, when the blade passes through the range R2 and the range R3, the other blades do not pass through the range R4 and the range R1, and therefore even if the torque or the speed is not increased in the range R2 and the range R3, the doneness is less affected. Therefore, the power saving of the work machine W can be achieved by setting at least a part of the range R4 and the range R1 to a predetermined range. Furthermore, in the range R1, since the cutting position of the lawn grass is less likely to shift upward than in the range R4, it is not necessary to increase the torque or the speed as much as in the range R4. Therefore, by setting at least a part of the range R4 to a predetermined range, it is possible to more effectively achieve power saving of the work machine W.

Although the control unit 5 controls the motor M so that the output of the motor M increases in a predetermined range in the processing example described above, the control unit 5 may control the motor M so that the output of the motor M decreases in a predetermined range. As an example, the control unit 5 may control the motor M so that the torque command value decreases while either one of the cutting portions 201a and 201b is located in the range R1.

In the above processing example, an example has been described in which the control unit 5 controls the motor M so that the torque command value becomes a different value in consideration of the doneness of the lawn mowing. However, the control unit 5 may control the motor M so that the torque command value becomes a different value in consideration of the urging direction of the lawn grass by the fan 202.

In the present embodiment, lawn grass cut by the airflow generated by the fan 202 is introduced into the collection unit 3 at the rear via the discharge port 301. Therefore, when the airflow toward the discharge port 301 to the collection unit 3 increases, lawn grass is more effectively introduced into the collection unit 3. Here, as a condition for increasing the airflow toward the discharge port 301, it is conceivable to increase the rotational output of the rotary member 20 when either one of the fans 202a and 202b is moving in a direction approaching the discharge port 301. As an example, it is conceivable to increase the output of the rotary member 20 when either one of the fans 202a and 202b rotates in a range of 0° to 180°, a range of 90° to 180°, or a range of 45° to 135°. Therefore, by controlling the torque command value of the motor M to be higher than a specified value in these ranges, the control unit 5 can more effectively urge the lawn grass toward the collection unit 3, and the collection efficiency of the lawn grass can be improved. To be noted, when the discharge port 301 is formed in the range W2 in the width direction illustrated in FIG. 2, that is, when the discharge port is formed in the range on the left half side in the housing in plan view, the rotary member 20 may be rotated in a direction opposite to the rotation direction illustrated in FIG. 2. In this case, the output of the rotary member 20 may be increased in at least a part of the range R3 and the range R4 in which either one of the fans 202a and 202b approaches the discharge port 301.

In addition, the range may be determined in consideration of both the doneness of lawn mowing and the collection efficiency of the lawn grass. For example, the control unit 5 may increase the torque in the case where either one of the cutting portions 201a and 201b is located in a range of 270° to 300°, and may increase the torque in the case where either one of the fans 202a and 202b is located in a range of 60° to 90°. In this case, the amount of increase in torque may be made different between the case of increasing the torque on the basis of the position of the cutting portion 201 and the case of increasing the torque on the basis of the position of the fan 202.

Other Embodiments

Figure 8:
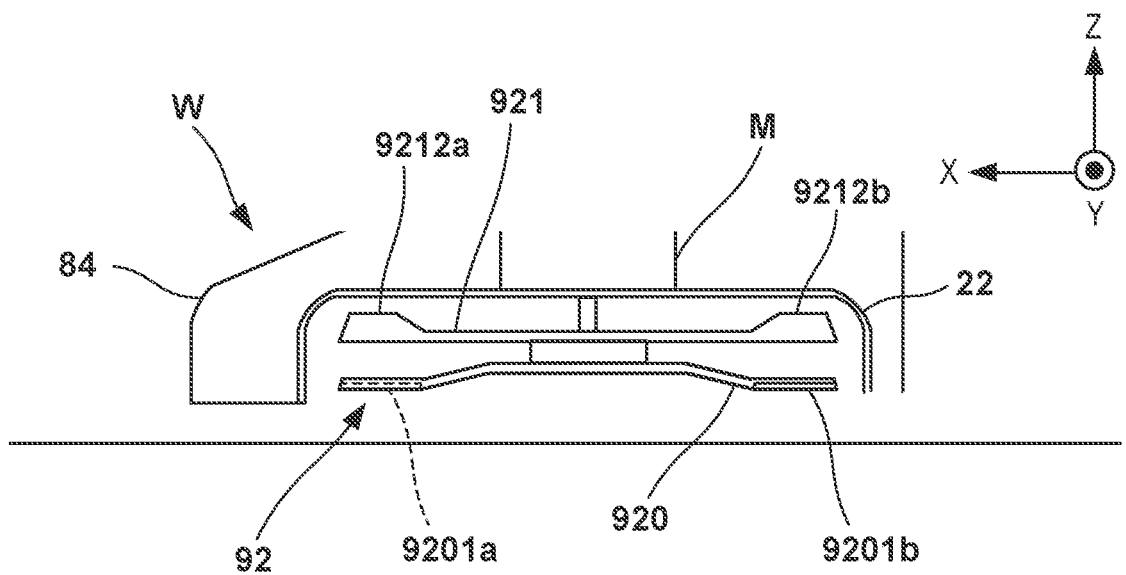
FIG. 8 is a schematic diagram of a working unit according to another embodiment.

Although the fan 202 and the cutting portion 201 are provided integrally with the rotary member 20 in the embodiment described above, these may be provided separately. FIG. 8 is a schematic view of a working unit 92 according to another embodiment, and is a diagram illustrating an example in which a cutting portion 9201 is provided in a rotary member 920 and a fan 9212 is provided in a rotary member 921. In this manner, the cutting portion 9201 and the fan 9212 may be rotatably provided by the motor M.

In addition, in such a case, the angle between the cutting portion 9201 and the fan 9212 may be deviated from each other. Furthermore, these angles may be deviated such that the timing at which the torque is desired to be increased for the cutting by the cutting portion 9201 coincides with the timing at which the torque is desired to be increased for the collection of the lawn grass by the fan 9212.

For example, it is assumed that the torque is increased in the case where either one of cutting portions 9201a and 9201b is located in the range R4 and in the case where either one of fans 9212a and 9212b is located within a range from 45° to 135°. In this case, the fan 9202a may be arranged to be shifted by 45° to the side opposite to the rotational direction with respect to the cutting portion 9201a. As a result, since the timing at which the torque is desired to be increased for the cutting by the cutting portion 9201 and the timing at which the torque is desired to be increased for the collection of the lawn grass by the fan 9212 coincide with each other, it is possible to more effectively improve both the doneness and the collection efficiency of the lawn grass.

In addition, in the above embodiment, a metal material such as iron or aluminum is exemplified as the material of the rotary member 20 constituting the cutting portion 201. However, a lighter rotary member 20 may be adopted. That is, a lighter blade may be adopted as the cutting portion 201.

In the case where the drive control of the motor M is performed only by the above-described rotation speed control, a metal material having a relatively large moment of inertia has been used as the material of the rotary member 20 in order to stabilize the rotation speed. However, since the current command value of the motor M can be directly controlled by using the vector control described above, the behavior of the rotary member 20 can be stably maintained even when a blade made of a lighter material is used.

As an example, a configuration in which a plate-shaped resin blade as a cutting portion is extended from a disk-shaped rotary member or a configuration in which a so-called nylon cord is attached to a disk-shaped rotary member can also be employed. By using such a blade having a smaller moment of inertia, the influence of inertia in the control can be reduced, so that more accurate drive control can be executed. In addition, since the weight of the rotary member itself is reduced, the power required for rotation is reduced, so that the power consumption related to the driving of the motor M can be reduced.

In addition, as another aspect of the cutting portion 201, a disk blade or the like in which the cutting portion is provided on a disk-shaped rotary member to be spaced apart in the circumferential direction may be used. In addition, the number of blades is not limited to this, and one blade or three blades may be used.

Although the cut lawn grass is collected by the collection unit 3 in the embodiment described above, it can be also employed for a so-called side discharge type lawn mower that discharges the lawn to the outside of the work machine W. Also in this case, the torque may be increased in a region urged toward the discharge port. As a result, since the output of the rotary member 20 is controlled so that the urging force toward the outside of the work machine W increases, it is possible to suppress the discharged lawn grass forming a lump.

Although the walking lawn mower has been described as an example in the embodiment described above, the configuration according to the above-described embodiment can also be applied to a riding lawn mower, a robot lawn mower, and the like.

In addition, the present invention is applicable not only to lawn mowers but also to other work machines such as snow blowers and cultivators. For example, in a blower that urges and blows off snow scraped up by an auger in a predetermined direction in a snow blower, the torque may be increased at a position urged in the snow projection direction. As a result, it is possible to suppress a case where snow is not sufficiently blown off by the blower and the blown snow is agglomerated in the vicinity of the work machine.

Summary of Embodiments

The above embodiment discloses at least the following work machine and program.

1. A work machine (for example, W) of the above embodiments comprises:
a drive source (for example, M);
a working unit (for example, 2) that includes a rotary member (for example, 20) rotated by the drive source and performs a predetermined work by rotation of the rotary member; and
a control unit (for example, 5, S3, S4) that controls the drive source so that output of the rotary member partially takes different values in one rotation of the rotary member.

According to this embodiment, it is possible to provide a technique advantageous for further improvement in efficiency, performance, and the like of the work machine.

2. According to the above embodiments,
the rotary member includes a cutting portion (for example, 201) capable of cutting a lawn grass, and
the working unit includes a cover portion (for example, 22) that covers the rotary member at least on a forward side in a traveling direction of the work machine.

According to this embodiment, since the output of the rotary member when mowing the lawn pushed down by the cover portion partially varies within one rotation, and thus the length of the cut lawn grass can be changed.

3. According to the above embodiments, wherein the control unit controls the drive source so that the output is higher in at least a part of a range in which the cutting portion moves toward the forward side than in a part different from the at least a part.

According to this embodiment, since the output of the rotary member increases in an area where the resistance generated between the lawn grass and the cutting portion is relatively small, the cutting portion is less likely to slip with respect to the lawn grass when cutting the lawn grass. Therefore, the heights of the cut lawn grass can be further equalized.

4. According to the above embodiments, the control unit controls the drive source so that the output is higher in at least a part of a range in which the cutting portion is located on the forward side as compared with a rotation shaft of the rotary member than in a part different from the at least a part.

According to this embodiment, since the output is increased in an area where the amount of lawn cut by the cutting portion is larger, it is possible to improve work efficiency and reduce power consumption at the same time.

5. According to the above embodiments, the control unit controls the drive source so that the output is lower in at least a part of a range in which the cutting portion moves toward a rear side in the traveling direction than in a part different from the at least a part.

According to this embodiment, since the output of the rotary member is decreases in an area where the resistance generated between the cutting portion and the lawn grass is large and the cutting portion is less likely to slip with respect to the lawn grass, power consumption can be reduced.

6. According to the above embodiments,
the rotary member includes a plurality of the cutting portions different in a circumferential direction, and
the control unit controls the drive source so that the output in a case where at least one of the plurality of the cutting portions is located in the at least a part is a different value from the output in a case where none of the plurality of the cutting portions is in the at least a part.

According to this embodiment, it is possible to improve work efficiency in a case where a plurality of cutting portions are provided.

7. According to the above embodiments, the rotary member includes an urging portion (for example, 202) that urges a target object by rotation of the rotary member.

According to this embodiment, since the output of the rotary member having the urging portion partially varies in one rotation, it is possible to vary the urging force on the target object according to the rotational position.

8. According to the above embodiments, the working unit further includes a cutting portion (for example, 201) capable of cutting a lawn grass, and a cover portion (for example, 22) that covers the rotary member, a discharge port (for example, 301) through which the lawn grass that is the target object and is cut by the cutting portion is discharged from a region covered by the cover portion is formed in the cover portion, and the control unit controls the drive source so that the output of the rotary member is high in at least a part of a range where the urging portion urges the lawn grass toward the discharge port in one rotation of the rotary member.

According to this embodiment, since the urging force on the lawn grass in the direction toward the discharge port increases, the lawn grass can be discharged more effectively.

9. According to the above embodiments, the rotary member includes an extending portion (for example, 20b) extending from a rotation shaft of the rotary member in a radial direction, the urging portion and the cutting portion are provided in the extending portion, the discharge port is provided on a rear side of the cover portion in a traveling direction, and the control unit controls the drive source so that, in one rotation of the rotary member, the output of the rotary member is high in at least a part of a range in which the urging portion urges the lawn grass toward the discharge port and the extending portion is located more on a forward side than the rotation shaft.

According to this embodiment, power consumption can be reduced by suppressing output in an area where the amount of lawn cut by the cutting portion is small while effectively discharging the lawn grass.

10. According to the above embodiments, the discharge port is formed within a range in a width direction in which the urging portion advances toward the discharge port.

According to this embodiment, it is possible to suppress urging of the lawn grass from the discharge port side toward the cover portion side.

11. According to the above embodiments, discharge port is formed so that the target object is discharged to an outside of the work machine.

According to this embodiment, since the output of the rotary member is controlled such that the urging force toward the outside of the work machine increases, it is possible to suppress formation of a lump of the discharged lawn grass.

12. A non-transitory computer-readable storage medium of the above embodiments stores a program for causing a computer of a work machine (for example, W) including a drive source (for example, M) and a working unit (for example, 2) that includes a rotary member (for example, 20) rotated by the drive source and performs a predetermined work by rotation of the rotary member, to function as:

a control unit (for example, S3, S4) that controls the drive source so that output of the rotary member partially takes different values in one rotation of the rotary member.

According to this embodiment, it is possible to provide a technique advantageous for further improvement in efficiency, performance, and the like of the work machine.

13. According to the above embodiments, the rotary member includes a cutting portion (for example, 201) capable of cutting a lawn grass, and the working unit includes a cover portion (for example, 22) that covers the rotary member on a forward side in a traveling direction of the work machine.

According to this embodiment, since the output of the rotary member when mowing the lawn pushed down by the cover portion partially varies within one rotation, and thus the length of the cut lawn grass can be changed.

14. According to the above embodiments, the control unit controls the drive source so that the output is higher in at least a part of a range in which the cutting portion moves toward the forward side than in a part different from the at least a part.

According to this embodiment, since the output of the rotary member increases in an area where the resistance generated between the lawn grass and the cutting portion is relatively small, the cutting portion is less likely to slip with respect to the lawn grass when cutting the lawn grass. Therefore, the heights of the cut lawn grass can be further equalized.

15. According to the above embodiments, the control unit controls the drive source so that the output is higher in at least a part of a range in which the cutting portion is located on the forward side as compared with a rotation shaft of the rotary member than in a part different from the at least a part.

According to this embodiment, since the output is increased in an area where the amount of lawn cut by the cutting portion is larger, it is possible to improve work efficiency and reduce power consumption at the same time.

16. According to the above embodiments, the control unit controls the drive source so that the output is lower in at least a part of a range in which the cutting portion moves toward a rear side in the traveling direction than in a part different from the at least a part.

According to this embodiment, since the output of the rotary member is decreases in an area where the resistance generated between the cutting portion and the lawn grass is large and the cutting portion is less likely to slip with respect to the lawn grass, power consumption can be reduced.

17. According to the above embodiments, the rotary member includes a plurality of the cutting portions different in a circumferential direction, and the control unit controls the drive source so that the output in a case where at least one of the plurality of the cutting portions is located in the at least a part is a different value from the output in a case where none of the plurality of the cutting portions is in the at least a part.

According to this embodiment, it is possible to improve work efficiency in a case where a plurality of cutting portions are provided.

18. According to the above embodiments, the rotary member includes an urging portion (for example, 202) that urges a target object by rotation of the rotary member.

According to this embodiment, since the output of the rotary member having the urging portion partially varies in one rotation, it is possible to vary the urging force on the target object according to the rotational position.

19. According to the above embodiments,
the working unit further includes a cutting portion (for example, 202) capable of cutting a lawn grass, and a cover portion (for example, 22) that covers the rotary member,
a discharge port through which the lawn grass that is the target object and is cut by the cutting portion is discharged from a region covered by the cover portion is formed in the cover portion, and
the control unit controls the drive source so that the output of the rotary member is high in at least a part of a range where the urging portion urges the lawn grass toward the discharge port in one rotation of the rotary member.

According to this embodiment, since the urging force on the lawn grass in the direction toward the discharge port increases, the lawn grass can be discharged more effectively.

20. According to the above embodiments,
the discharge port is provided on a rear side of the cover portion in a traveling direction, and
the part is a part in which the urging portion moves in the rear side.

According to this embodiment, power consumption can be reduced by suppressing output in an area where the amount of lawn cut by the cutting portion is small while effectively discharging the lawn grass.

21. According to the above embodiments,
the discharge port is formed within a range in a width direction in which the urging portion advances toward the discharge port.

According to this embodiment, it is possible to suppress the lawn grass being biased from the discharge port side toward the cover portion side.

22. According to the above embodiments, the discharge port is formed so that the target object is discharged to an outside of the work machine.

According to this embodiment, since the output of the rotary member is controlled such that the urging force toward the outside of the work machine increases, it is possible to suppress formation of a lump of the discharged lawn grass.

The invention is not limited to the foregoing embodiments, and various variations/changes are possible within the spirit of the invention.

What is claimed is:
1. A work machine comprising:
a drive source;
a working unit that includes a rotary member rotated by the drive source and performs a predetermined work by rotation of the rotary member;
a control unit that controls the drive source so that a torque applied to the rotary member varies among a plurality of predefined values in a single rotation of the rotary member; and
a rotation sensor that detects a rotational position during the single rotation of the rotary member,
wherein the rotary member includes a cutting portion capable of cutting a lawn grass,
wherein the control unit controls the drive source so that an amount of the torque applied to the rotary member when the rotational position of the cutting portion as detected by the rotation sensor is located within a predetermined rotational position range in the single rotation is higher than the amount of the torque applied to the rotary member when the rotational position of the cutting portion as detected by the rotation sensor is located outside the predetermined rotational position range.

2. The work machine according to claim 1, wherein the working unit includes a cover portion that covers the rotary member at least on a forward side in a traveling direction of the work machine.

3. The work machine according to claim 2, wherein the predetermined rotational position range is a range in which the cutting portion moves toward the forward side in the single rotation.

4. The work machine according to claim 2, wherein the predetermined rotational position range is a range in which the cutting portion is located on the forward side in the single rotation as compared with a rotation shaft of the rotary member.

5. The work machine according to claim 2, wherein the control unit controls the drive source so that the amount of the torque applied to the rotary member when the rotational position of the cutting portion as detected by the rotation sensor is located within a second predetermined rotational position range in the single rotation is lower than the amount of the torque applied to the rotary member when the rotational position of the cutting portion as detected by the rotation sensor is located outside the second predetermined rotational position range,
wherein the second predetermined rotational position range is a range in which the cutting portion moves toward a rear side in the traveling direction in the single rotation.

6. The work machine according to claim 3, wherein
the rotary member includes a plurality of the cutting portions that differ within a circumferential direction, and
the control unit controls the drive source so that the amount of the torque applied to the rotary member when the rotational position of at least one of the cutting portions as detected by the rotation sensor is located within the predetermined rotational position range is higher than the amount of the torque applied to the rotary member when the rotational positions of all of the cutting portions as detected by the rotation sensor are located outside the predetermined rotational position range.

7. The work machine according to claim 1, wherein the rotary member includes an urging portion that urges a target object by rotation of the rotary member.

8. The work machine according to claim 7, wherein
the working unit further includes a cover portion that covers the rotary member,
a discharge port through which the lawn grass that is the target object and is cut by the cutting portion is discharged from a region covered by the cover portion is formed in the cover portion, and
the control unit controls the drive source so that the amount of the torque applied to the rotary member when the rotational position of the cutting portion as detected by the rotation sensor is located within a third predetermined rotational position range in the single rotation is higher than the amount of the torque applied to the rotary member when the rotational position of the cutting portion as detected by the rotation sensor is outside of the third predetermined rotational position range,
wherein the third predetermined rotational position range is a range in which the urging portion urges the lawn grass toward the discharge port in the single rotation.

9. The work machine according to claim 8, wherein
the rotary member includes an extending portion extending from a rotation shaft of the rotary member in a radial direction,
the urging portion and the cutting portion are provided in the extending portion,
the discharge port is provided on a rear side of the cover portion in a traveling direction of the work machine, and
the control unit controls the drive source so that the amount of the torque applied to the rotary member, when the rotational position detected by the rotation sensor indicates that i) the cutting portion is located within the third predetermined rotational position range and ii) the extending portion is located more on a forward side in the traveling direction than the rotation shaft, is higher than the amount of the torque applied to the rotary member when the rotational position detected by the rotation sensor does not indicate that i) the cutting portion is located within the third predetermined rotational position range and ii) the extending portion is located more on a forward side in the traveling direction than the rotation shaft.

10. A non-transitory computer-readable storage medium storing a program for causing a computer of a work machine including a drive source, a working unit that includes a rotary member rotated by the drive source and performs a predetermined work by rotation of the rotary member, and a rotation sensor that detects a rotational position in a single rotation of the rotary member, wherein the rotary member includes a cutting portion capable of cutting a lawn grass, to function as:
a control unit that controls the drive source so that an amount of torque applied to the rotary member varies from among a plurality of different values in the single rotation of the rotary member,
wherein the control unit controls the drive source so that the amount of torque applied to the rotary member when the rotational position of the cutting portion as detected by the rotation sensor is located within a predetermined rotational position range in the single rotation is higher than the amount of torque applied to the rotary member when the rotational position of the cutting portion as detected by the rotation sensor is located outside the predetermined rotational position range.

11. The non-transitory storage medium according to claim 10, wherein
the predetermined rotational position range is a range in which the cutting portion moves toward a forward side in a traveling direction of the work machine in the single rotation.

12. The non-transitory storage medium according to claim 10, wherein the predetermined rotational position range is a range in which the cutting portion is located on a forward side in a traveling direction of the work machine in the single rotation as compared with a rotation shaft of the rotary member.

13. The non-transitory storage medium according to claim 10, wherein the control unit controls the drive source so that the amount of torque applied to the rotary member when the rotational position of the cutting portion as detected by the rotation sensor is located within a second predetermined rotational position range in the single rotation is lower than the amount of torque applied to the rotary member when the rotational position of the cutting portion as detected by the rotation sensor is located outside the second predetermined rotational position range,
wherein the second predetermined rotational position range is a range in which the cutting portion moves toward a rear side in a traveling direction of the work machine in the single rotation.

14. The non-transitory storage medium according to claim 11, wherein the cutting portion further comprises a plurality of cutting portions, and the control unit controls the drive source so that the amount of torque applied to the rotary member when the rotational position of at least one of the cutting portions as detected by the rotation sensor is located within the predetermined rotational position range is higher than the amount of torque applied to the rotary member when the rotational position of all of the cutting portions as detected by the rotation sensor are outside of the predetermined rotational position range.

15. The non-transitory storage medium according to claim 10, wherein
a discharge port through which the lawn grass that is a target object and is cut by the cutting portion is discharged from a region covered by the cover portion is formed in a cover portion that covers the rotary member, and
the control unit controls the drive source so that the amount of torque applied to the rotary member when the rotational position of the cutting portion as detected by the rotation sensor is located within a third predetermined rotational position range in the single rotation is higher than the amount of torque applied to the rotary member when the rotational position of the cutting portion as detected by the rotation sensor is located outside the third predetermined rotational position range,
wherein the third predetermined rotational position range is a range in which an urging portion that urges the target object by rotation of the rotary member urges the lawn grass toward the discharge port in the single rotation.

16. The non-transitory storage medium according to claim 15, wherein
the discharge port is provided on a rear side of the cover portion in a traveling direction of the work machine.

17. The work machine according to claim 9, wherein the discharge port is formed within a range in a width direction in which the urging portion advances toward the discharge port.

18. The work machine according to claim 8, wherein the discharge port is formed so that the target object is discharged to an outside of the work machine.

19. The non-transitory storage medium according to claim 16, wherein
the discharge port is formed within a range in a width direction in which the urging portion advances toward the discharge port.

20. The non-transitory storage medium according to claim 15, wherein
the discharge port is formed so that the target object is discharged to an outside of the work machine.

* * * * *